(12) United States Patent
Kurihara et al.

(10) Patent No.: US 8,418,743 B2
(45) Date of Patent: Apr. 16, 2013

(54) BRAZING SYSTEM

(75) Inventors: Michiyasu Kurihara, Handa (JP);
Kiyoshi Furukawa, Kariya (JP); Toru Inagaki, Nagoya (JP); Zhenyu Yan, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/356,023

(22) Filed: Jan. 23, 2012
(Under 37 CFR 1.47)

(65) Prior Publication Data

US 2013/0001272 A1    Jan. 3, 2013

(30) Foreign Application Priority Data

Jan. 31, 2011   (JP) .................................. 2011-017907

(51) Int. Cl.
*B23K 1/00* (2006.01)
*B23K 20/14* (2006.01)
(52) U.S. Cl.
USPC ................... 164/8; 164/9; 164/183; 164/227; 164/229; 164/230
(58) Field of Classification Search ............... 228/8, 9, 228/102, 183, 227, 229, 230
See application file for complete search history.

(56) References Cited

U.S. PATENT DOCUMENTS

| 5,128,506 | A | * | 7/1992 | Dahne et al. | ................ | 219/85.13 |
| 5,271,545 | A | * | 12/1993 | Boswell et al. | .................. | 228/43 |
| 5,573,688 | A | * | 11/1996 | Chanasyk et al. | ............ | 219/388 |
| 5,660,543 | A | * | 8/1997 | Marks et al. | .................. | 432/152 |

FOREIGN PATENT DOCUMENTS

| JP | U-2-1561 | 1/1990 |
| JP | A-2004-111901 | 4/2004 |
| JP | A-2004-358484 | 12/2004 |
| JP | A-2007-078328 | 3/2007 |

OTHER PUBLICATIONS

Nov. 13, 2012 Office Action issued in JP Application No. 2011-017907 (with English translation).

* cited by examiner

*Primary Examiner* — Kevin P Kerns
*Assistant Examiner* — Kevin E Yoon
(74) *Attorney, Agent, or Firm* — Oliff & Berridge, PLC

(57) ABSTRACT

A brazing system for brazing component members of a workpiece has a brazing chamber an inside of which is made a heating space of a volume corresponding to the workpiece, a radiant heating means provided with a plurality of heating sources which are positioned so as to correspond to a plurality of regions into which two facing surfaces of the workpiece are respectively divided, a convection heating means for circulating a heated inert gas to the heating space so as to heat the workpiece, and a control means for controlling the operation of the heating sources and the circulation of the inert gas. Each heating source is independently controlled by the control means, and the convection heating means circulates the inert gas so as to reduce a temperature difference of the workpiece caused by the heating sources.

7 Claims, 13 Drawing Sheets

ONLY RADIANT HEATING | ONLY CONVECTION HEATING | RADIANT HEATING +CONVECTION HEATING

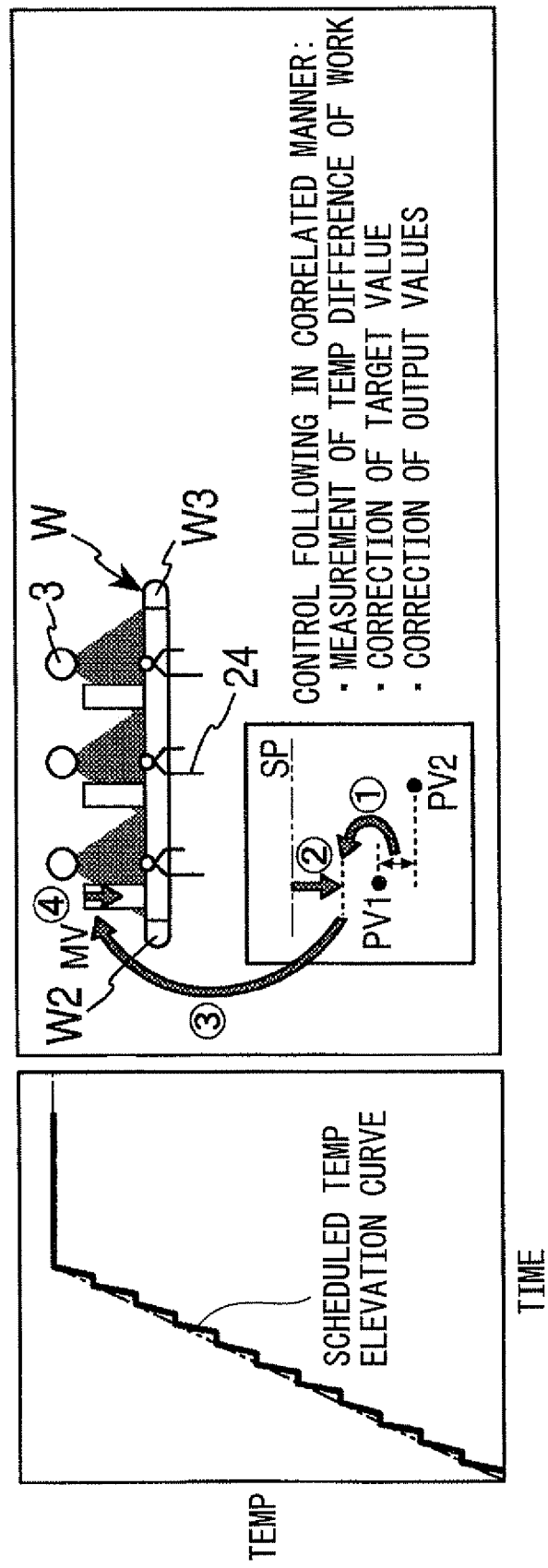

CONTROL ALGORITHM

INDEPENDENT CONTROL

RESULTS OF TEMP MEASUREMENT UNDER INDEPENDENT CONTROL

RESULTS OF TEMP MEASUREMENT UNDER GROUPING CONTROL

OVEN CROSS-SECTION

HEAT EXCHANGER SIZE
SMALL TO LARGE SIZES HANDLED BY SINGLE OVEN

BRAZING SYSTEM

BACKGROUND OF THE INVENTION

1. Field of the Invention

The present invention relates to a small-sized and good heat efficiency brazing system which is suitable for brazing automobile heat exchangers and other various types of metal products, in particular for individually brazing workpieces.

2. Description of the Related Art

An automobile heat exchanger is produced by assembling aluminum components and joining them by a brazing material. As a conventional brazing system which is used for the brazing process, one which is provided with a large-sized continuous oven which conveys a plurality of workpieces by a conveyor and consecutively brazes them is known (for example, Japanese Patent Publication (A) No. 2007-78328 etc.) One example of the hardware configuration is shown in FIG. 12A and FIG. 12B. In FIG. 12A, at one end side of a brazing chamber 102, a preheating chamber 101 is connected via a passage 103. At the other end side of the brazing chamber 102, a cooling chamber 104 which is comprised of a slow cooling chamber 105 and a rapid cooling chamber 106 is arranged. A heating passage 107 is formed connecting the insides of these chambers (FIG. 12B). The preheating chamber 101 has an open part 100 at one end side and is communicated through the heating passage 107 with an open part 108 which is formed at the other end side of the rapid cooling chamber 106.

As shown in FIG. 12B, the heating passage 107 is loaded with workpieces W carried on a conveyor 109 from the open part 100 of the preheating chamber 101. The inside of the preheating chamber 101 is an air atmosphere. At the top surface, an in-oven circulating fan F' is set. Due to the heat sources H' (gas or electric heaters etc.) which are arranged above and below the conveyor 109, for example, the temperature is controlled to 400° C. and the workpieces W' on the conveyor 109 are preheated. The following brazing chamber 102 similarly has an in-oven circulating fan F' at its top surface. The inside of the oven is made a nitrogen atmosphere so as to maintain a low oxygen state. The heat sources H' are controlled to for example make the temperature 600 to 700° C. so as to heat the transported workpieces W' to the melting point of the brazing material or more. The cooling chamber 104 is provided with a water-cooling type slow cooling chamber 105 and an air-cooling type rapid cooling chamber 106. The brazed workpieces W' are cooled and taken out from the open part 108.

SUMMARY OF THE INVENTION

The brazing systems of the related art, as shown in FIG. 12C, are designed to process different sizes of heat exchangers, that is, to process large and small workpieces W' by a single oven. Further, as the continuous oven configuration, large and small workpieces W' are conveyed by a conveyor while simultaneously being processed so as to secure the desired production capacity. In this case, to enable large and small workpieces W' to be simultaneously processed and absorb variations due to the sizes etc. of the workpieces W', it is important that the heating passage 107 have a sufficient size and to increase the heat capacity of the heating space so as to stabilize the ambient temperature.

For this reason, there is the problem that the brazing system became large in size. The oven length from the preheating chamber 101 to the cooling chamber 104 becomes, for example, tens of meters. Along with this, the in-oven circulation fans F' of the preheating chamber 101 and the brazing chamber 102 and the heat sources H' and other such ancillary facilities also easily become bulky. Since a large heating space is used to simultaneously process a large number of workpieces W', the amount of energy consumption is large. Further, since the two ends of the continuous oven have the open parts 100 and 108, to maintain the atmosphere of the brazing chamber 102 at a low oxygen state, nitrogen gas has to continue being filled.

Furthermore, in recent years, there has been an increase in demand for medium and small production runs, but it is not possible to reduce the size or reduce the costs of the system matched to the production ability. This is because if making the hardware configuration smaller in size as it is, the heat capacity will become smaller and therefore the ambient temperature will easily fluctuate, so it is difficult to uniformly heat a plurality of workpieces W to be heat treated or the different parts of a workpiece W and control them to a predetermined brazing temperature. As a result, even if the production amount falls, it is necessary to use a large-sized facility. Reduction of the costs by cutting the amount of energy consumption cannot be hoped for.

Therefore, the present invention has as its object the provision of a novel brazing system which reduces the size of the system for brazing a heat exchanger or other workpiece so as to reduce the amount of energy consumption, which enables a workpiece to be raised to the brazing temperature fast and uniformly, and which enables an improvement in the productivity.

The present invention provides a brazing system for brazing component members of a workpiece, comprising a brazing chamber an inside of which is made a heating space of a volume corresponding to the workpiece, a radiant heating means provided with a plurality of heating sources for heating the workpiece which is held in the heating space by radiant heat, the plurality of heating sources positioned so as to correspond to a plurality of regions of the workpiece into which two facing surfaces of the workpiece which faces the heating sources are respectively divided, a convection heating means for circulating a heated inert gas to the heating space so as to heat the workpiece by convection heating, and a control means for controlling the operation of the plurality of heating sources and the circulation of the inert gas, wherein each of the heating sources is independently controlled by the control means, and the convection heating means circulates the inert gas by convection so as to reduce a temperature difference of the workpiece caused by the plurality of heating sources.

According to this, a brazing chamber having a heating space corresponding to one workpiece is used and radiant heating by heaters or other heating sources and convection heating by a heated inert gas are combined so as to improve the temperature leveling ability in the small-sized heating space and make the workpiece as a whole reach the brazing temperature uniformly at a high speed. Due to this, a small-sized good heating efficiency brazing system can be realized and the time required for individual brazing operations can be shortened. Further, a massive system is not required, so the energy efficiency is high and costs low and the productivity is improved.

In the present invention, the workpiece may be a flat shape and the surfaces with the large heat receiving areas may be made the two facing surfaces facing which the plurality of heating sources are arranged. According to this, since the large heat receiving area flat surfaces of the workpiece are made the two facing surfaces and the heating sources are used for radiant heating, the heating efficiency is improved and the temperature can be effectively raised.

In the present invention, the plurality of heating sources may be made near infrared ray heaters and arranged in proximity to two facing surfaces of the brazing chamber comprised of a material which passes near infrared rays. By making the brazing chamber a size corresponding to the workpiece, arranging a plurality of near infrared ray heaters with excellent heating efficiency at the two facing surfaces, and emitting rays in this way, it is possible to effectively heat a workpiece in the brazing chamber by radiant heating.

In the present invention, an introduction port and discharge port of the inert gas may be provided at the other two facing surfaces of the brazing chamber. By introducing and discharging inert gas from the other two facing surfaces of the brazing chamber in this way, the effect is obtained that a flow of gas is formed in a direction perpendicular to the direction of radiant heating by the heating sources and the distribution of temperature of the workpiece heated by the radiant heating is eliminated.

In the present invention, the plurality of heating sources may be provided at least at four locations facing each of the two facing surfaces of the workpiece. By providing the plurality of heating sources at least at four locations facing each of the two facing surfaces of the workpiece and individually controlling the temperatures by the control unit in this way, the effect of leveling the temperature of the whole is enhanced.

In the present invention, the workpiece may be an aluminum heat exchanger. Since an aluminum heat exchanger is used as the workpiece in this way, the effect of employing the present invention is high.

In the present invention, the control means can make the inert gas a certain temperature near the brazing temperature of the workpiece and can perform feedback control for the plurality of heating sources based on the temperatures of the plurality of regions of the workpiece which are detected by a plurality of temperature detecting means.

In this way, the control means specifically makes the inert gas a certain temperature near the brazing temperature of the workpiece and makes it circulate by convection in the heating space. Further, it is possible to adjust the outputs of the plurality of heating sources in accordance with the temperatures of the different parts of the workpiece so as to effectively and uniformly heat the workpiece as a whole.

BRIEF DESCRIPTION OF THE DRAWINGS

The present invention may be more fully understood from the description of preferred embodiments of the invention, as set forth below, together with the accompanying drawings, in which:

FIG. 1C is a schematic perspective view of a near infrared ray heater which the brazing system is provided with;

FIG. 6A and FIG. 6B are views for explaining a preferable temperature elevation control method which is employed in a control unit of the brazing system of the present invention;

DESCRIPTION OF THE PREFERRED EMBODIMENTS

Figure 1A:
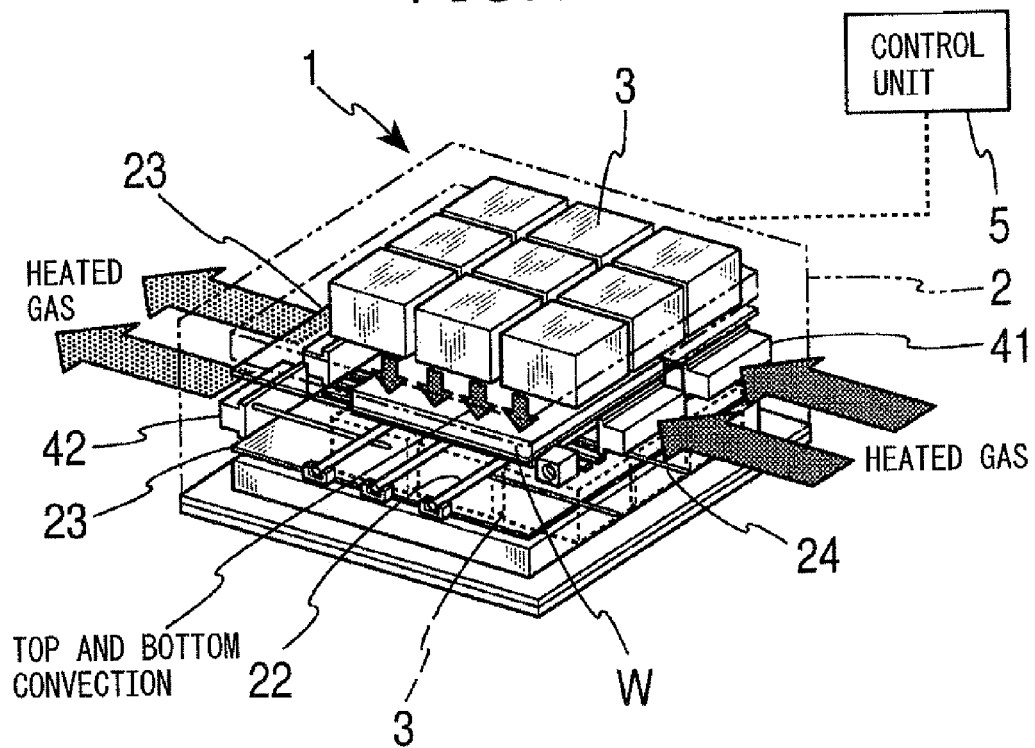
FIG. 1A is a schematic perspective view which shows the configuration of main parts of a brazing system according to a first embodiment of the present invention.
Figure 1B:
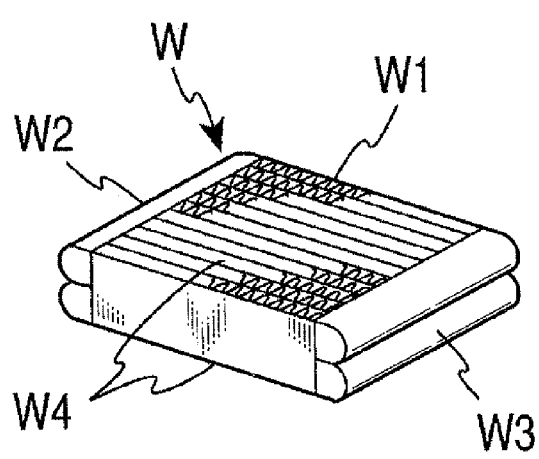
FIG. 1B is a schematic perspective view of a heat exchanger which is brazed by a brazing system of the present invention.
Figure 2A:
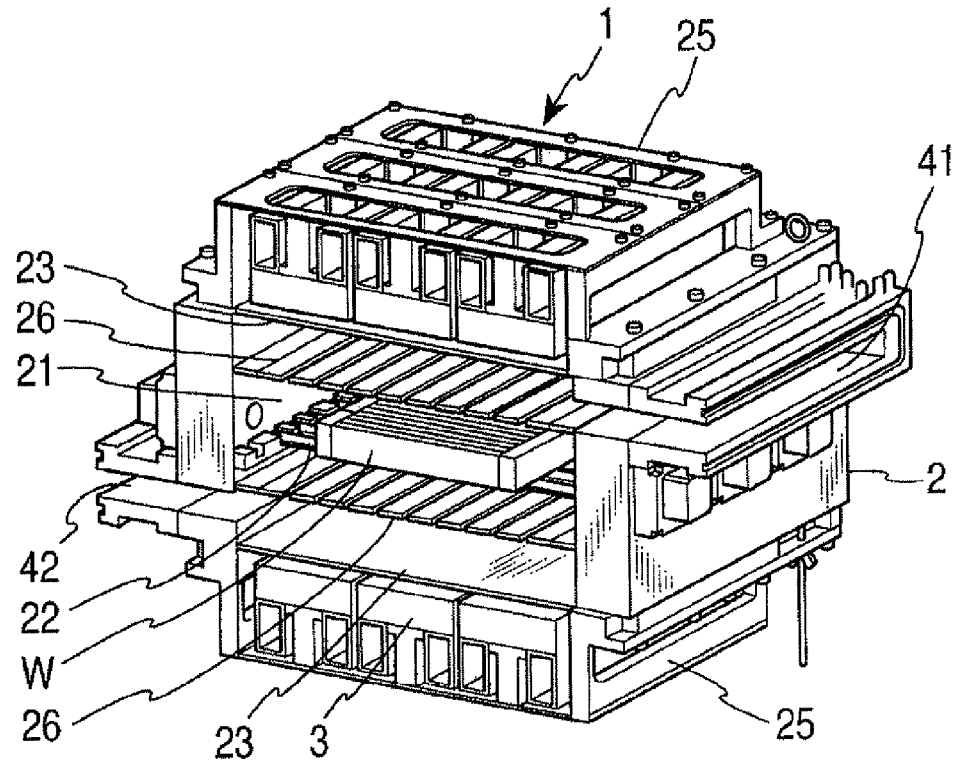
FIG. 2A is a perspective view which shows the overall configuration of a brazing system according to a first embodiment.
Figure 2B:
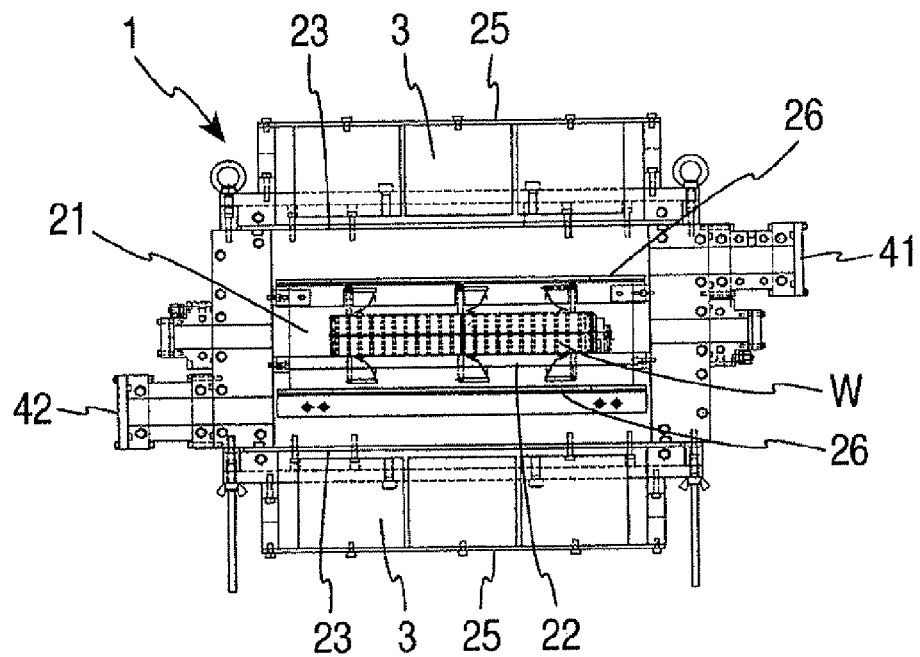
FIG. 2B is a front view of the brazing system according to the first embodiment of the present invention.

Below, a first embodiment of the present invention will be explained in detail while referring to the drawings. A brazing system of the present invention is a small-sized system for individually heating and brazing a metal object (workpiece). The brazing method using this system can be applied to for example the brazing process of various metal products such as heat exchangers to be mounted in vehicles. FIG. 1A shows the configuration of the main parts of the brazing system 1, while FIG. 1B shows the schematic configuration of a heat exchanger as a workpiece W to be brazed in the present embodiment. A heat exchanger is, for example, made of aluminum. It may also be made from other metals such as copper and stainless steel. FIGS. 2A and 2B show an example of the configuration of the brazing system 1.

In FIG. 1A, the brazing system 1 is provided with a brazing chamber 2 which holds a workpiece W, a plurality of near infrared ray heaters 3 which are arranged above and below the brazing chamber 2 and serve as heating sources of a radiant heating means, and an introduction path 41 and discharge path 42 for circulating heated inert gas serving as the convection heating means to the brazing chamber 2. The control unit 5 controls the plurality of near infrared ray heaters 3 and the circulation of the inert gas and combines radiant heating and convection heating so as to raise the temperature of the workpiece W as a whole to the brazing temperature uniformly at a high speed. Details on this control will be explained later.

In FIG. 1B, the workpiece W as constituted by a heat exchanger has a flat box-shaped heat exchanger core W1 and a pair of tanks W2 and W3 arranged at the two ends of the same. The heat exchanger core W1 has a known structure of a large number of flat-shaped tubes arranged in parallel between which heat exchange fins are arranged and with two ends of the tubes passed through headers of the tanks W2 and W3 and joined together. In the present embodiment, in the following explanation, the wide area surfaces positioned at the top and bottom in the figure (top surface and bottom surface) are called the "core surfaces W4" forming the two facing surfaces. At the pair of tanks W2 and W3, not shown heat exchange medium introduction ports or discharge ports are provided, the flow path of the heat exchange medium is connected, and a heat exchange medium can be run through the insides of the tubes of the heat exchanger core W1.

The brazing chamber 2 is a box shape at the inside of which a heating space 21 is formed. At the center part, a workpiece W is arranged. Here, as shown in the figures, the workpiece W is arranged so that the wide heat receiving area core surfaces W4 are positioned at the top and bottom. The bottom surface core surface W4 is supported on a plurality of heat resistant glass rod-shaped support members 22 which are arranged traversing the inside of the heating space 21. The brazing chamber 2 has a heating space 21 of a volume which is able to hold the workpiece W to be processed and can be set in accordance with the shape or size of the workpiece W so as to give a size having suitable space for convection of the inert gas around the entire workpiece W. Further, the brazing chamber 2 has the chamber surfaces 23 facing the top and bottom core surfaces W4 of the workpiece W (top surface and bottom surface) as the "two facing surfaces". It is comprised of a material passing near infrared rays, in this case, quartz glass, and has a plurality of near infrared ray heaters 3 arranged above and below the same.

Figure 1C:
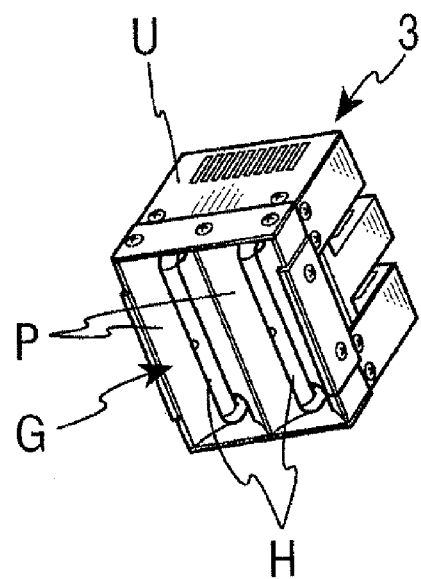

As shown in FIG. 1C, a near infrared ray heater 3 is a rectangular-shaped parallel emission type which has a known structure of a block-shaped unit U, protective glass G provided at the front surface, a plurality of rod-shaped heaters H arranged in parallel inside the unit U, and a reflecting plate P arranged behind the heaters H. In the present embodiment, nine of these near infrared ray heaters 3 are arranged at the top surface side of the brazing chamber 2 (top near infrared ray heaters) and nine are arranged at the bottom surface side (bottom near infrared ray heaters). They are made to face the top and bottom core surfaces W4 of the workpiece W which is arranged in the heating space 21. Each nine near infrared ray heaters 3 are comprised of three arranged aligned to the left and right and three to the depth direction in FIG. 1A. Due to this, the top core surface W4 of the workpiece W is divided into nine regions corresponding to the nine top near infrared ray heaters 3, while the bottom core surface W4 is divided into nine regions corresponding to the nine bottom near infrared ray heaters 3. Each region can be independently heated.

At this time, in the heating space 21, a plurality of temperature detecting means constituted by temperature sensors 24 (for example, thermocouples) are arranged for detecting the temperatures at a plurality of temperature measurement points at the top and bottom core surfaces W4 of the workpiece W. The temperature sensors 24 are preferably provided for each of the regions corresponding to the top or bottom near infrared ray heaters 3. The detection results are output to the control unit 5. The temperatures of the top and bottom core surfaces W4 of the workpiece W have a temperature distribution in the plane, so it is possible to use the temperatures of the regions as the basis to adjust the outputs of the near infrared ray heaters 3 and efficiently heat the workpiece W. Note that, the near infrared ray heaters 3, when transmitting radiant heat to a heated object constituted by an aluminum workpiece W, are lowest in reflectance (high in heat absorption) and emit about 0.8 μm wavelength light (near infrared light). They are excellent in heating efficiency, so are effective.

The brazing chamber 2 is provided with a gas introduction port 41 which opens at one of the other two facing surfaces, that is, the right side surface top of the figure, and which has heated inert gas introduced into it from the hot gas introduction path and with a gas discharge port 42 which opens at the other of the other two facing surfaces, that is, the left side surface bottom of the figure, and which is connected to a hot gas discharge path. As the inert gas, usually nitrogen gas is used. This is heated by an external heating unit to close to the brazing temperature and is introduced into the brazing chamber 2 as a hot gas. The hot gas circulates along the top core surface W4 of the workpiece W and passes through the clearances between fins of the heat exchanger core W1 to flow to the bottom core surface W4 side and head to the gas discharge port 42. Due to this, it is possible to maintain the atmosphere of the heating space 21 in a low oxygen state and use heat convection to transport the heat of the workpiece W from the high temperature parts to the low temperature parts so as to uniformly heat the entirety.

As shown in FIGS. 2A and 2B, more specifically, at the top surface and bottom surface of the brazing chamber 2, container-shaped cover members 25 are fastened. Inside these cover members 25, top and bottom near infrared ray heaters 3 are held. Further, inside the brazing chamber 2, it is possible to provide vent plates 26 which face the top and bottom core surfaces W4 of the workpiece W so as to define a top space of the heating space 21 at which the gas introduction port 41 opens and a bottom space of the heating space 21 at which the gas discharge port 42 opens separate from the holding space of the workpiece W. The vent plates 26 may, for example, be made of a material which passes near infrared rays such as quartz glass, may be provided at the surface with a large number of slits for gas circulation, and may make the hot gas which is introduced from the gas introduction port 41 a vertical flow for uniform feed to the entire surface of the workpiece W. At this time, the widths of the gas introduction port 41 and the gas discharge port 42, as shown in the figure, are made to match the width of the right side surface or left side surface to increase the open part and thereby enable fast introduction and discharge of the inert gas.

Figure 3A:
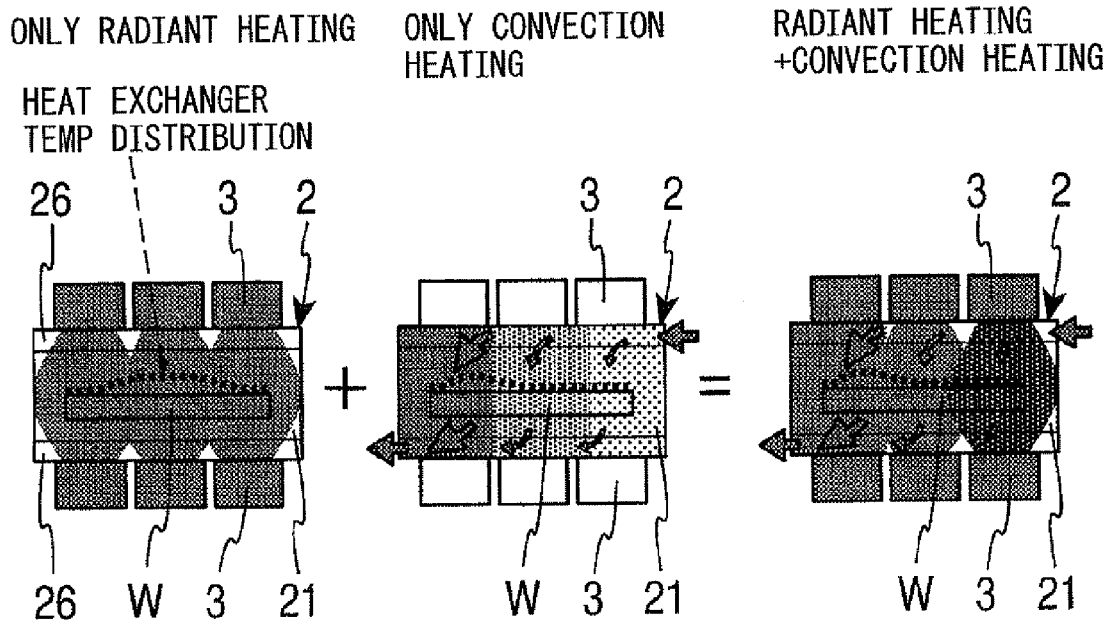
FIG. 3A and FIG. 3B are views for explaining the effects due to the brazing system of the present invention.
Figure 3B:
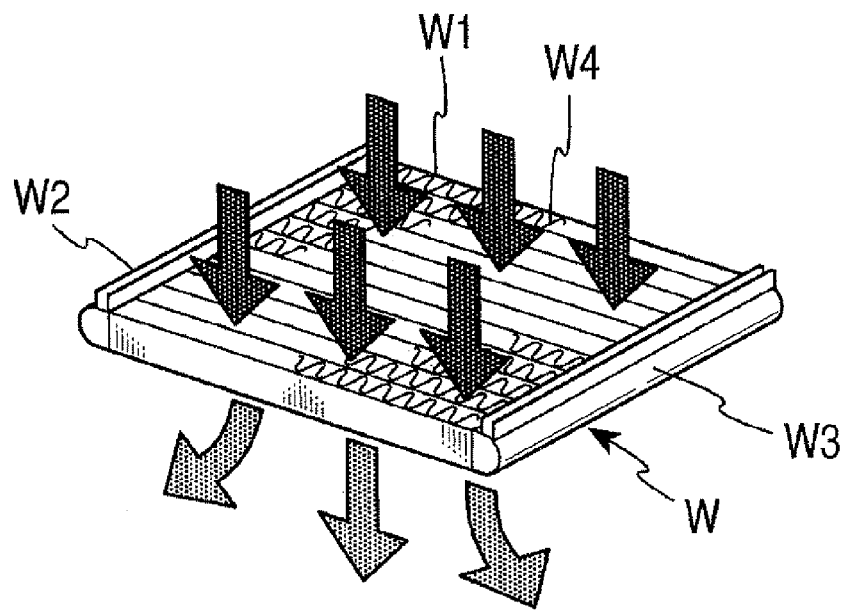

Next, using FIGS. 3A and 3B, the principle of heating of the workpiece W by this configuration of a brazing system 1 will be explained. In the present embodiment, as shown in FIG. 3A, the workpiece W, that is, a heat exchanger, is heated by radiant heating using near infrared ray heaters 3 which are arranged above and below the heating space 21 and is heated by convection heating by introduction of a hot gas of nitrogen gas to the inside of the heating space 21. Here, as shown in FIG. 3B, the workpiece W, that is, the heat exchanger, is arranged so that the core surfaces W4 with their large heat receiving areas become the top and bottom surfaces. At each of the top and bottom, nine near infrared ray heaters 3 are arranged, whereby it becomes possible to divide each of the top and bottom core surfaces W4 to nine regions which correspond to the near infrared ray heaters 3 and adjust the temperatures individually. That is, by detecting the temperature of each region by a temperature sensor 24 and increasing or decreasing the output of the corresponding near infrared ray heater 3 based on the detected temperature, temperature elevation control for each region becomes possible. For example, with brazing of an aluminum product, the target temperature of each near infrared ray heater 3 is set so that the workpiece W becomes the melting temperature of the brazing material or more, usually a predetermined temperature of 600° C.±10° C.

However, in the case of only radiant heating, due to the physical phenomena due to the heat balance, the heat radiating ability differs at the center part and peripheral parts of the workpiece W. As illustrated, the temperature becomes high at the center part where the heat radiating ability is small, while the temperature becomes low at the peripheral parts (left and right ends of figure) where the heat radiating ability is large, so a temperature distribution arises. Further, a temperature difference easily arises between the surface parts and inside parts of the core surfaces W4 of the workpiece W. This temperature distribution is not easily eliminated by just adjusting the outputs of the plurality of near infrared ray heaters 3. It is difficult to uniformly heat a workpiece W in a short time to a predetermined temperature.

On the other hand, in the case of only convection heating, a flow of a hot gas is formed inside the heating space 21 from the gas introduction port 41 along the workpiece W to the gas discharge port 42. Heat easily remains at the gas discharge port 42 side, so the temperature becomes higher at the end of the workpiece positioned near the gas discharge port 42 (left end part of figure). Such a temperature distribution cannot be eliminated by adjusting the temperature or flow rate of the nitrogen gas. This is also not easy by changing the structure of the brazing chamber 2 such as the layout of the gas introduction port 41 or gas discharge port 42.

Therefore, in the present invention, hybrid heating which combines these radiant heating and convection heating is used to raise the temperature of the workpiece W as a whole at a high speed up to a predetermined brazing temperature and level the heat. In particular, in the present embodiment, for workpieces W of aluminum products, short wavelength emission by near infrared ray heaters 3 with excellent heating efficiency is used to directly heat the top and bottom core surfaces W4 with their wide heat receiving areas and, furthermore, a hot gas of nitrogen gas is introduced to form convection inside of the heating space 21. At this time, the near infrared ray heaters 3 for radiant heating use are arranged above and below the brazing chamber 2, while the gas introduction port 41 and gas discharge port 42 for the convection heating use are made to open at the facing side surfaces of the brazing chamber 2, so the direction of gas flow for convection heating use becomes overall the horizontal direction (direction from right to left in figure) and is perpendicular to the direction of radiant heating (up-down direction). Due to this, the effect is obtained that heat is transported from the high temperature parts to the low temperature parts of the workpiece W and temperature unevenness in the horizontal plane of the workpiece W can be eliminated.

Figure 4A:
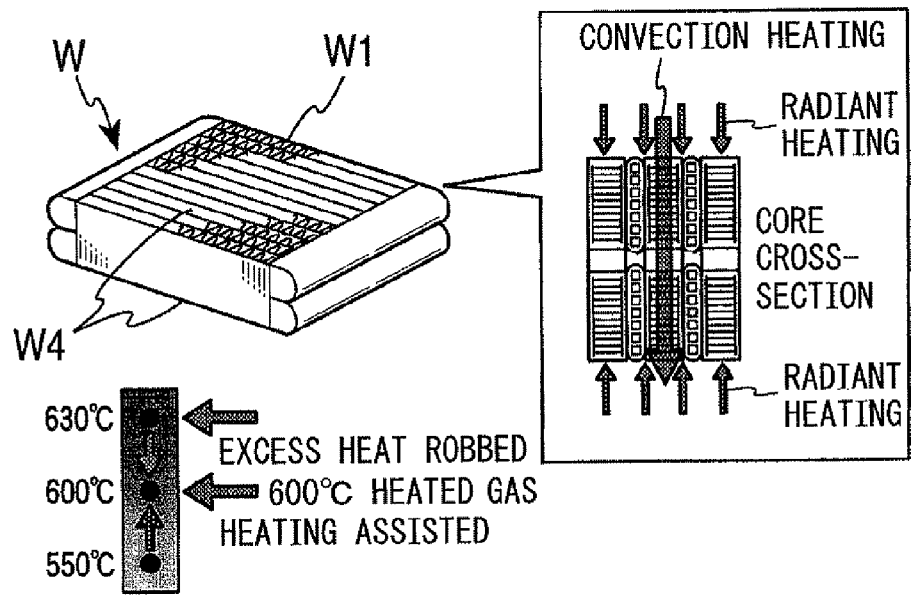
FIG. 4A is a view for explaining the effects of convection heating by the brazing system of the present invention.

Further, by arranging vent plates 25 above and below the workpiece W inside the heating space 21, the orientation of the hot gas is changed to a direction perpendicular to the workpiece W to form a flow of gas which passes through the heat exchanger core W1. Due to this, it is possible to utilize the features of the heat exchanger so as to run hot gas in the direction of the maximum heat exchange area and thereby promote heat leveling. That is, as shown in FIG. 4A, the heat exchanger core W1 is comprised of tubes and heat exchange fins alternately laid. The heat due to the radiant heating is transmitted from the top and bottom surfaces of the core surfaces W4 to the inside. Furthermore, by hot gas running through the spaces between the tubes, heat exchange is performed by convection heating through the large surface area fins. At this time, by sending in hot gas which has been heated to a predetermined brazing temperature (for example, 600° C.), excess heat is robbed from the higher temperature parts (for example 630° C.) and assists heating to the lower temperature parts (for example 550° C.), so the workpiece W as a whole can be uniformly and rapidly raised in temperature.

Figure 4B:
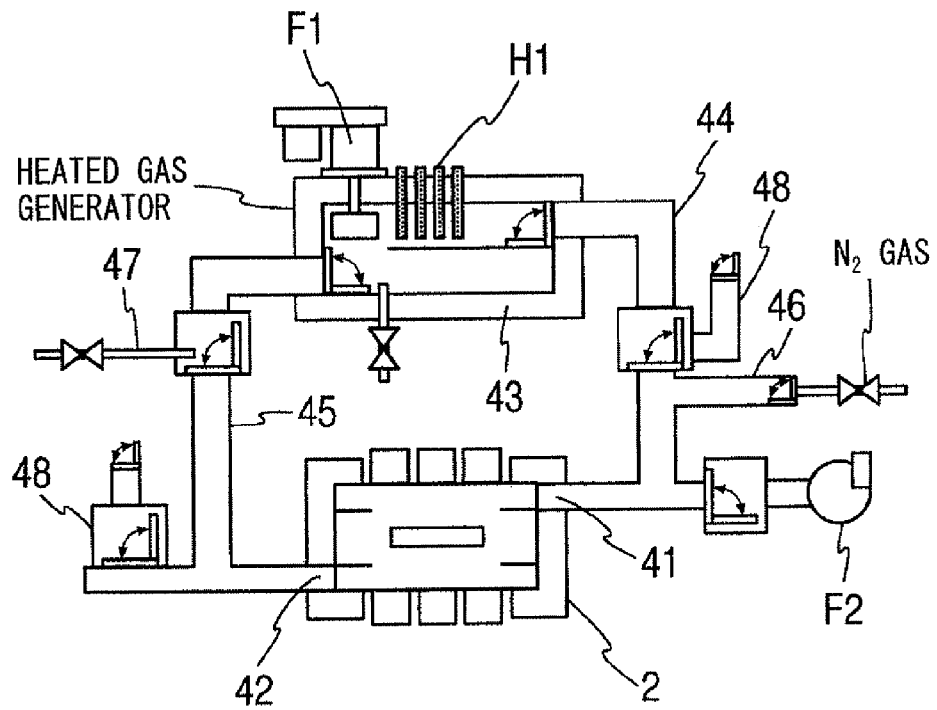
FIG. 4B is a schematic view which shows an example of the configuration of a convection heating system which is attached to the brazing system of the present invention.

FIG. 4B shows an example of a convection heating means constituted by a convection heating system 4. The convection heating system 4 is provided with a convection heating chamber 43 which is provided with a heater H1 serving as the convection heating source and a circulation fan F1 serving as a convection heating air flow source. The convection heating chamber 43 is connected with the gas introduction port 41 and the gas discharge port 42 of the brazing chamber 2 by a hot gas introduction path 44 and hot gas discharge path 45 respectively. In the middle of the hot gas introduction path 44, an introduction pipe 46 is connected for introducing nitrogen gas for use for adjustment of convection heating from a not shown nitrogen gas feed unit. In the middle of the hot gas discharge path 45, a nitrogen gas pipe 47 is connected for maintaining the hot gas which runs through the brazing chamber 2 at a certain oxygen concentration. Further, the hot gas introduction path 44 and hot gas discharge path 45 are provided with passages 48 which are communicated with the atmosphere and are provided with cutoff valves. A cooling fan F2 is set for air-cooling the workpiece W.

By providing such a convection heating system 4, it is possible to form a circulating path which stably supplies hot gas of nitrogen gas of the brazing temperature region from the convection heating chamber 43 to the brazing chamber 2 at a predetermined flow rate. The control unit 5, for example, uses the heater H1 for heating the nitrogen gas which is circulated to the convection heating chamber 43 when it is lower than a predetermined temperature and supplies ordinary temperature nitrogen gas from the introduction pipe 46 when it is higher than a predetermined temperature so as to maintain the gas at a predetermined temperature. Further, after the brazing is ended, the circulation path to the convection heating chamber 43 is closed, the passages 48 to the atmosphere 43 are opened, and the cooling fan F2 is used to blow air for cooling to thereby enable the workpiece W to be quickly air-cooled.

Figure 5A:
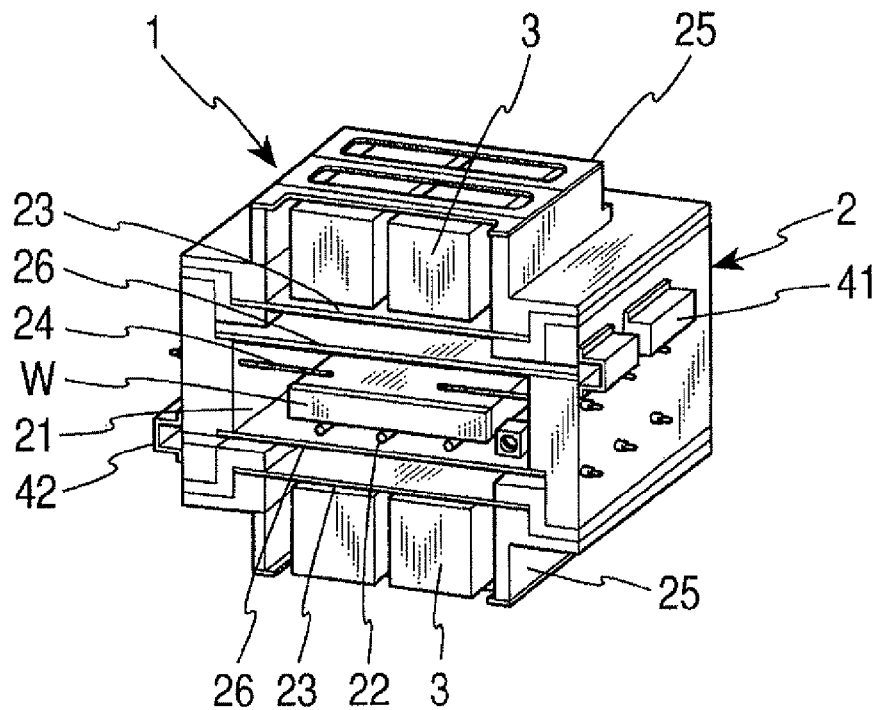
FIG. 5A is a perspective view of a brazing system according to a second embodiment of the present invention.
Figure 5B:
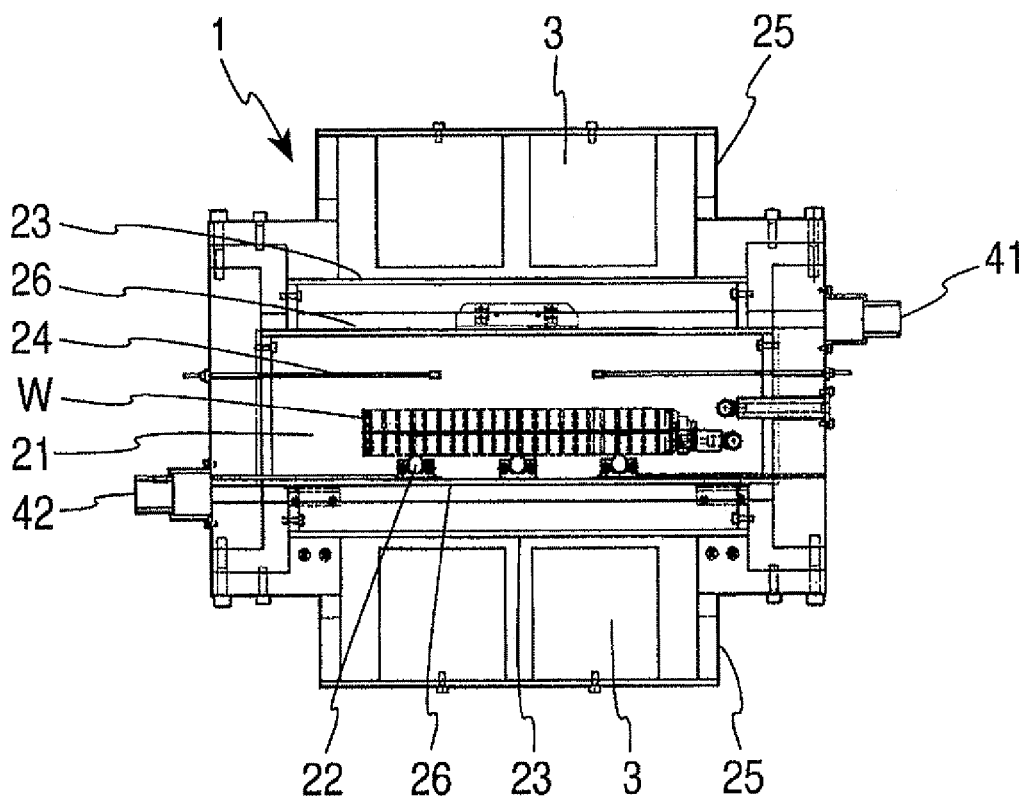
FIG. 5B is a front view of the brazing system according to the second embodiment.

FIGS. 5A and 5B show a second embodiment of the present invention and illustrate the overall configuration of the brazing system 1. The brazing system 1 of the present embodiment has the same basic configuration as the above first embodiment and differs only in the numbers of the top and bottom near infrared ray heaters 3 which are arranged at the top surface and bottom surface of the brazing chamber 2. In the first embodiment, nine each top and bottom near infrared ray heaters 3 are provided to enable the temperature of the facing top and bottom surfaces of the workpiece W to be controlled divided into nine regions each, but it is possible to freely set the numbers in accordance with the size of the workpiece W or brazing chamber 2, the heating capacities of the near infrared ray heaters 3, etc.

Specifically, if arranging two or more near infrared ray heaters 3 in each of the length direction and width direction of the workpiece W for a total of at least four heaters at each of the top and bottom of the workpiece W, a temperature leveling effect is obtained by combination with convection heating. When the workpiece W is a rectangular shape heat exchanger, preferably, as illustrated, three near infrared ray heaters 3 are arranged in the length direction (depth direction of the figure)

and two near infrared ray heaters 3 are arranged in the width direction (left-right direction of the figure) to arrange six heaters at each of the top and bottom of the workpiece W so as to thereby obtain a sufficient effect.

Figure 6B:
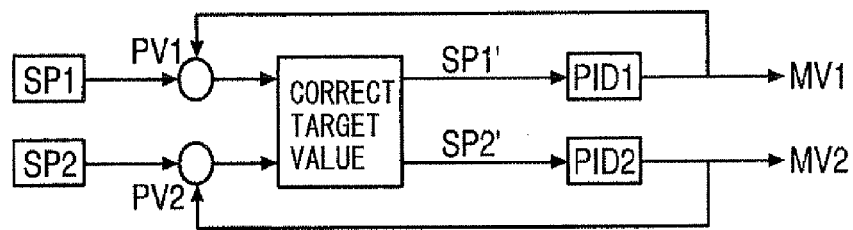
Figure 6C:
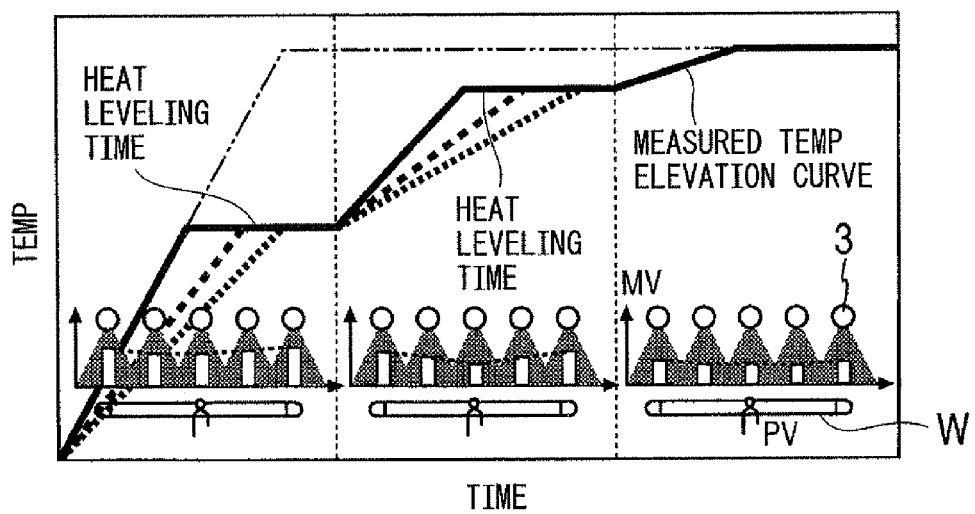
FIG. 6C is a view for explaining a general temperature elevation control method.
Figure 7A:
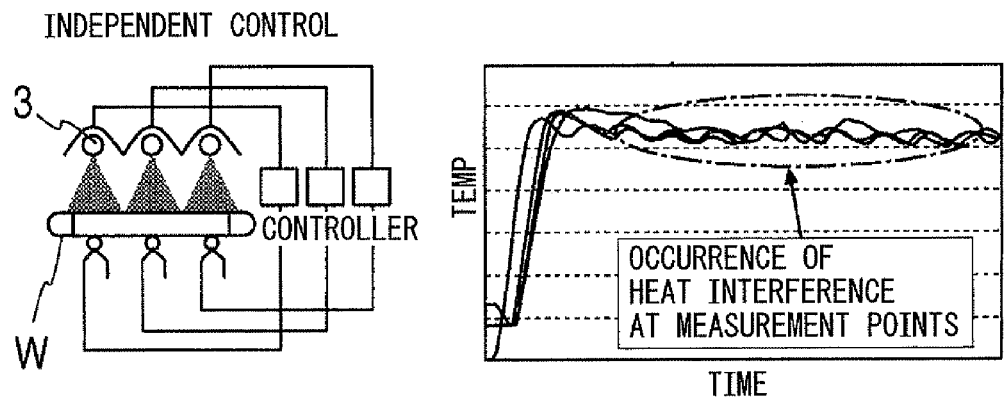
FIG. 7A is a view for explaining a general temperature leveling control method.
Figure 7B:
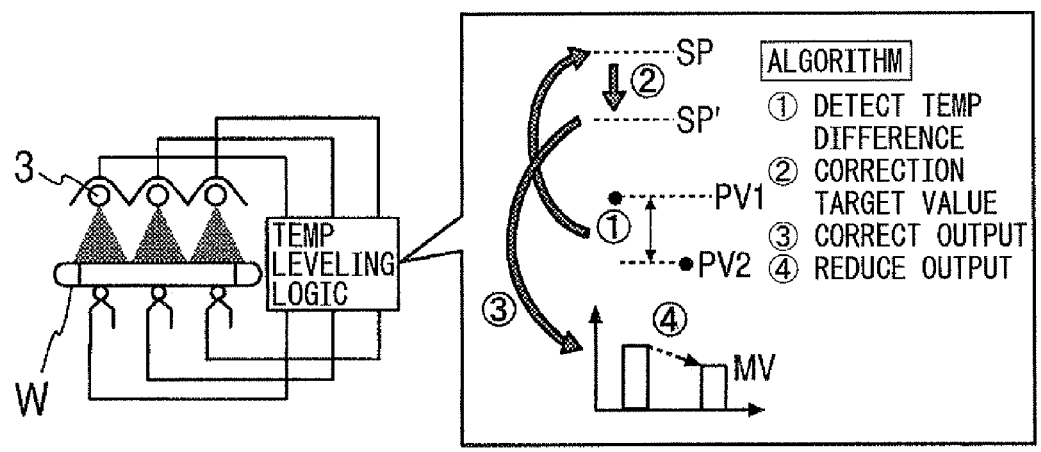
FIG. 7B is a view for explaining a temperature leveling control method which is employed in the control unit of the brazing system of the present invention.
Figure 7B:
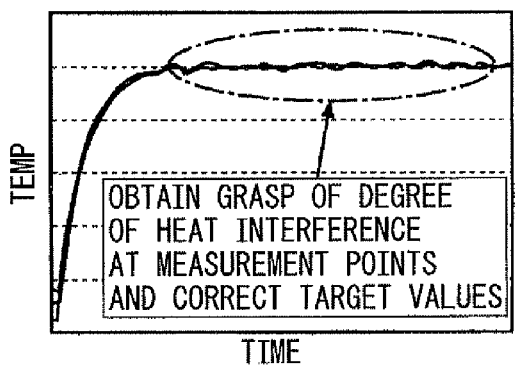

Next, FIG. 6 and FIG. 7 will be used to explain heating control of the workpiece W by a brazing system 1 of the present invention. As explained above, the control unit 5 of the present invention introduces hot gas of nitrogen gas to the brazing chamber 2 at a predetermined temperature and a predetermined flow rate and, while circulating the gas by convection, adjusts the outputs of the top and bottom near infrared ray heaters 3 arranged above and below the workpiece W for each region so as to control the radiant heating. Here, FIG. 6C shows a general independent control method. This comprises obtaining a grasp in advance of the temperature elevation characteristics at each of the regions of the workpiece W, dividing the control into a plurality of stages (for example, three stages), setting an output value MV for each region in advance, and shifting to the next stage of control when a detected measurement temperature PV reaches a predetermined temperature. For example, at the initial stage of temperature elevation, it makes the outputs of the near infrared ray heaters 3 high. It then lowers the outputs in stages. Further, it makes the outputs higher the more to the peripheral parts with their large heat radiation characteristics and reduces the output difference in stages. In this control, since the temperature elevation characteristics differ with each region, the temperature leveling time until a predetermined temperature is reached becomes longer and rapid heating is difficult.

Therefore, preferably, as the temperature elevation control method of the workpiece W, grouping control shown in FIGS. 6A and 6B is performed. For example, as shown by the control algorithm in FIG. 6B, for a plurality of temperature measurement points (measurement points) which are set at the workpiece W, a target temperature SP1' is calculated though a process for correction of target temperature using the target temperature SP1 and the temperature difference between the measurement temperature PV1 and the measurement temperature PV2 at the adjoining measurement point which are detected by the temperature sensors 24. This target temperature SP1' is used as the basis for PID calculation. The output values MV of the near infrared ray heaters 3 are calculated to maintain the temperature levelness while raising the temperature to the target temperature SP.

Specifically, as shown in FIG. 6A, when using three near infrared ray heaters 3 aligned between the tanks W2 and W3 of the workpiece W, if the measurement temperature PV2 of the center part is lower than the measurement temperature PV1 at the left end determined by the temperature sensor 24, the temperature difference between these is made to become smaller by lowering the target temperature SP of the near infrared ray heater 3 at the left end part and along with this lowering the output value MV in a correction routine. Conversely, if the measurement temperature PV2 of the adjoining region is higher than the measurement temperature PV1, the target temperature SP and the output value MV are raised.

This grouping control is applied to the temperature elevation control of the corresponding top and bottom near infrared ray heaters 3 at each region of the workpiece W. Heating is controlled while feeding back the adjoining temperature difference. Due to this, it becomes possible to obtain a grasp of the degree of heat interference at any measurement point, correct the target values of the peak temperatures, and change the outputs of the plurality of near infrared ray heaters 3 in a correlative manner.

Furthermore, by similarly employing grouping control for the temperature leveling controlling after the target temperature is reached, it is possible to suppress heat interference. FIG. 7A is a view which explains a general temperature leveling control method. When using independent control for heating regions of the workpiece W by the near infrared ray heaters 3, the outputs MV are individually controlled so that the measurement temperatures PV at the corresponding measurement points become the target temperature SP. In this regard, heat conduction from adjoining regions is not considered, so heat interference occurs and the target temperature cannot be stably controlled. As opposed to this, in the grouping control of FIG. 7B, the temperature difference of measurement temperatures PV1 and PV2 at adjoining measurement points is detected and the temperature difference, that is, the degree of heat interference, is made to become smaller by feedback control of the target temperature SP and outputs MV, so temperature leveling control becomes possible.

Figure 8:
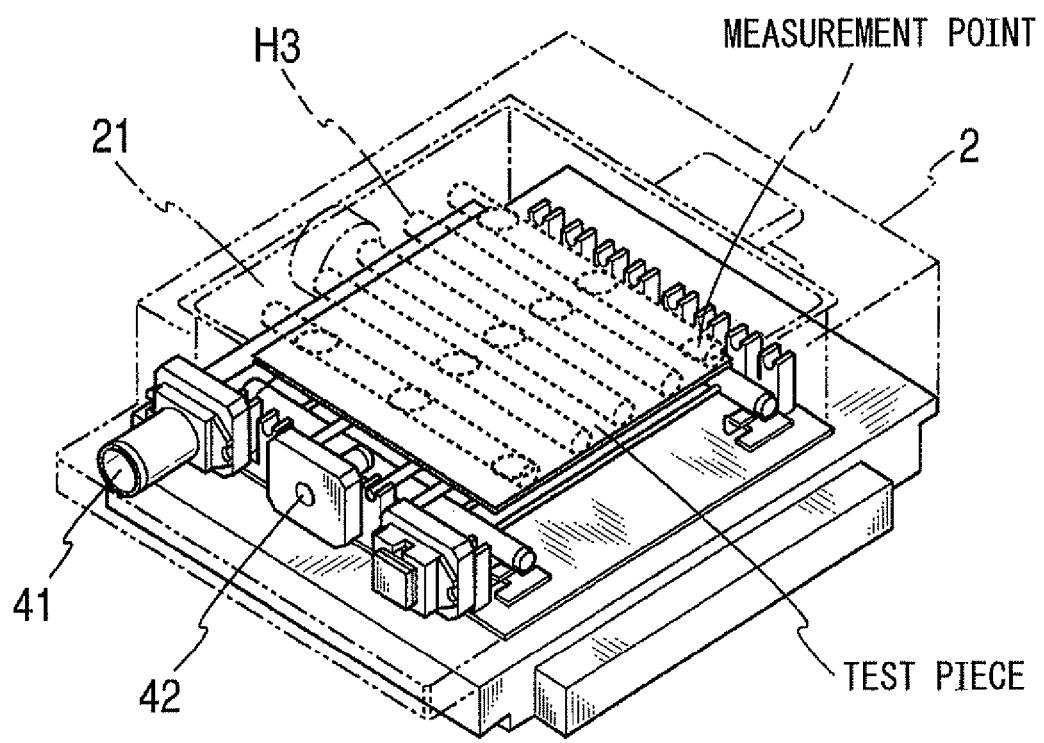
FIG. 8 is a schematic view of a brazing system for explaining a test method for confirming the advantageous effect of the present invention.

To confirm the advantageous effects of the present invention, the brazing system 1 shown in FIG. 8 was used for a heating test of a test piece. The brazing system 1 is configured substantially the same as the system of FIG. 1, but instead of the single unit-type near infrared ray heaters 3, five rod-shaped near infrared ray lamp heaters H3 are arranged in parallel above the brazing chamber 2. The test piece is a flat box shape made of aluminum (300×250×40 mm) and is supported in the brazing chamber 2 by a plurality of support members 21 arranged in parallel. The brazing chamber 2 is provided with a gas introduction port 41 and discharge port 42 and is designed to cause convection by heated nitrogen gas (600° C., 10 m/s). The target temperature was made 500° C., the outputs of the near infrared ray lamp heaters H3 were controlled by the above-mentioned independent control and grouping control, and the temperatures at the illustrated temperature measurement points (center part 5 points, peripheral parts 4 points) were measured. The results are shown in FIG. 9A and FIG. 9B.

Figure 9A:
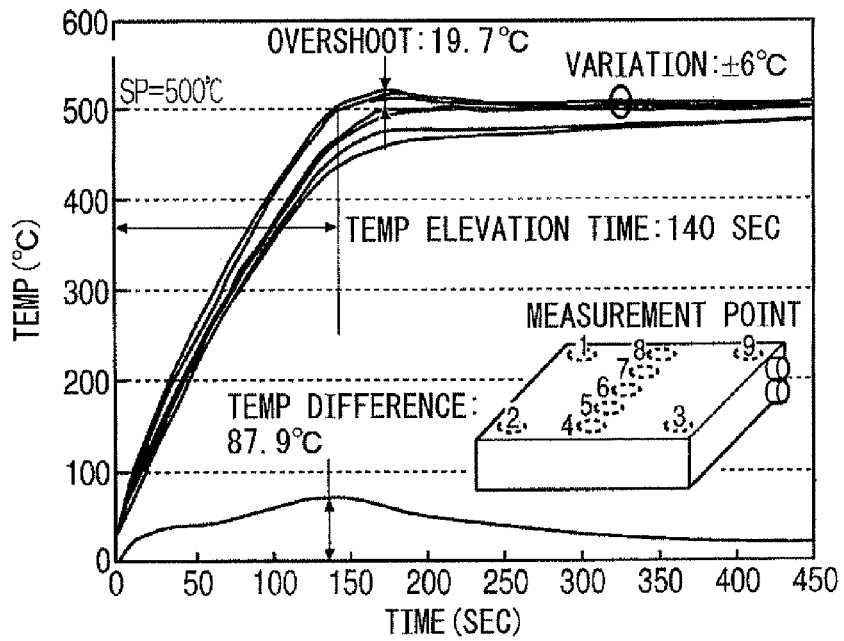
FIG. 9A is a view which shows the relationship between the temperature and time when using the brazing system which is shown in FIG. 8 to perform temperature control by independent control.
Figure 9B:
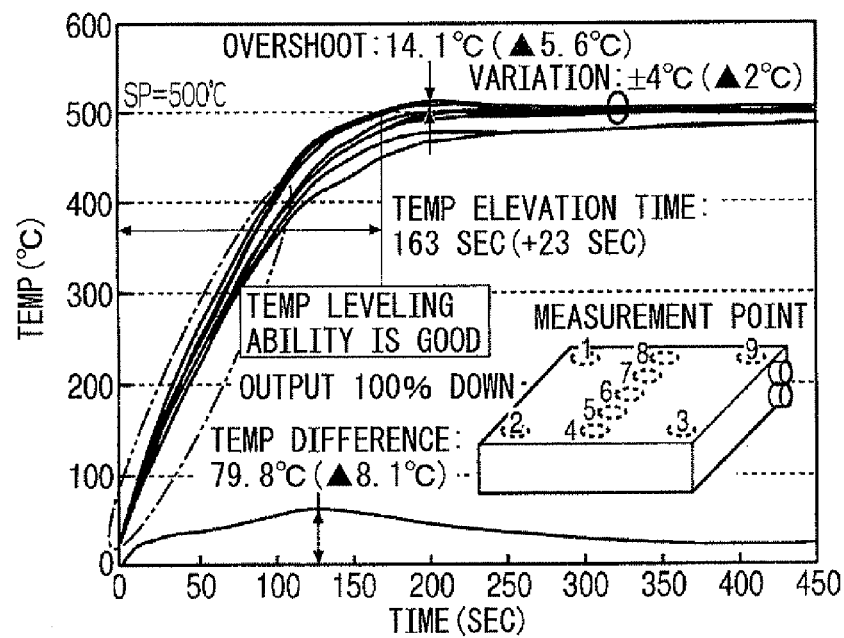
FIG. 9B is a view which shows the relationship between the temperature and time when using the brazing system which is shown in FIG. 8 to perform temperature control by grouping control.

As clear from FIG. 9A, when employing independent control, the temperature elevation time until reaching the target temperature is a short 140 seconds, but the temperature difference at the temperature measurement points is large and the temperature variation in the plane of the test piece is large. Further, overshoot of the target temperature is seen and there is temperature variation, so time is required until stabilization. As opposed to this, by employing grouping control, while the temperature elevation time until reaching the target temperature becomes somewhat longer, the heat leveling ability at the time of temperature elevation is improved and overshoot of the target temperature and temperature variation become smaller (see FIG. 9B). As a result, it is learned that it is possible to shorten the time until stabilization at the target temperature and possible to uniformly heat the test piece as a whole, so the energy efficiency is excellent.

Figure 10A:
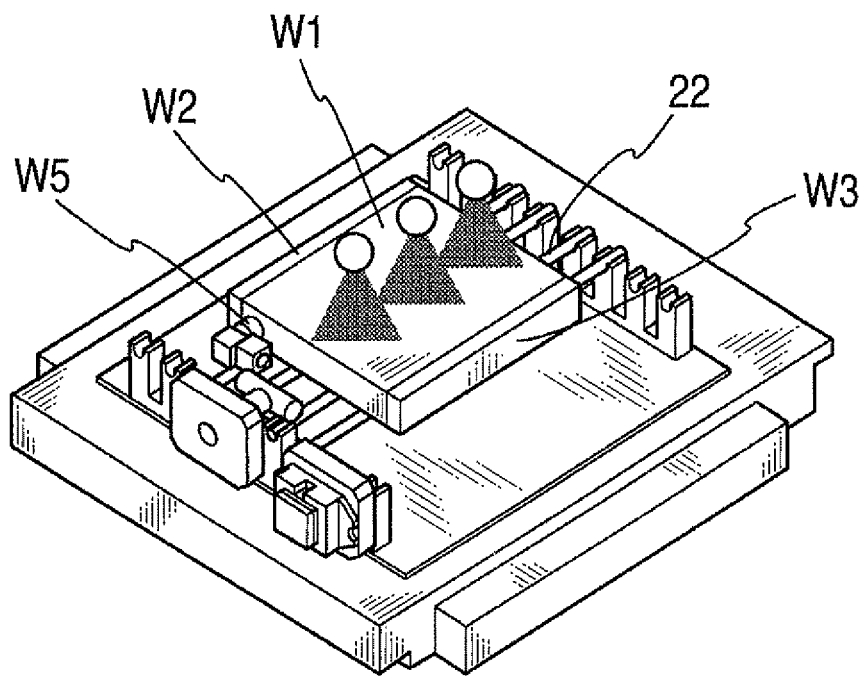
FIG. 10A is a partial perspective view of a brazing system according to a third embodiment of the present invention.
Figure 10B:
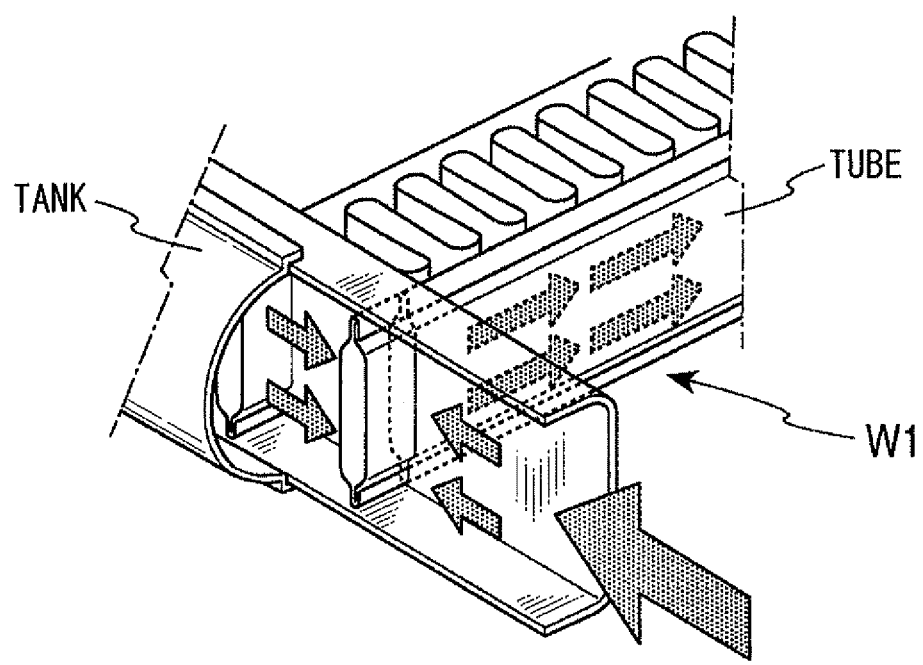
FIG. 10B is an enlarged partial cross-sectional perspective view of a heat exchanger which was brazed by the brazing system according to the third embodiment.

FIG. 10A and FIG. 10B are views showing a third embodiment of the present invention which combines an internal heating system in addition to the above-mentioned radiant heating and convection heating. When the workpiece W to be brazed in the present invention is a heat exchanger, as explained above, the heat exchanger core W1 is comprised of a large number of tubes and has flow paths communicated with tanks inside it. Therefore, if connecting a pipeline W5 for introducing nitrogen gas for convection heating to the tanks W2 and W3 at the two ends of the heat exchanger core W1, it would be possible to heat the heat exchanger core W1 and the tanks W2 and W3 from the inside and the heat elevation ability would be further improved.

Figure 11:
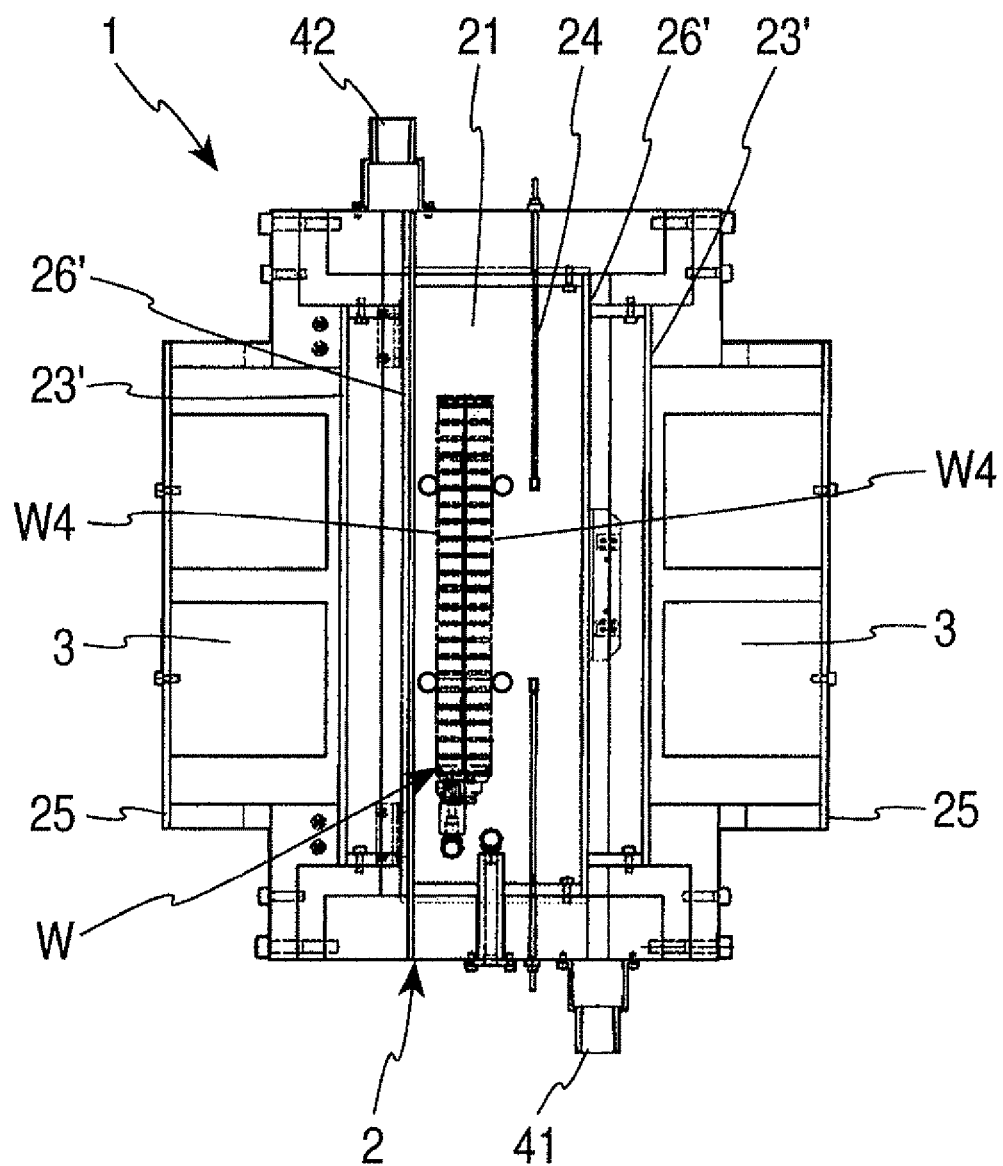
FIG. 11 is a front view of a brazing system according to a fourth embodiment of the present invention.
Figure 12A:
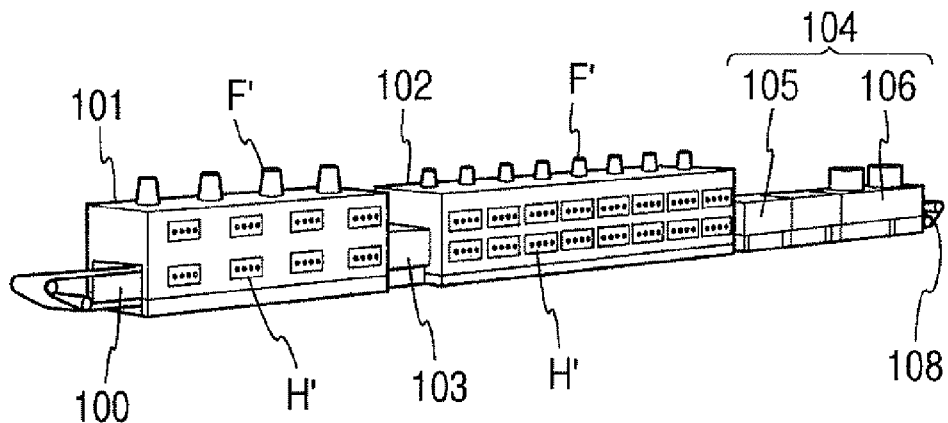
FIG. 12A is an overall perspective view of a brazing system according to the related art.
Figure 12B:
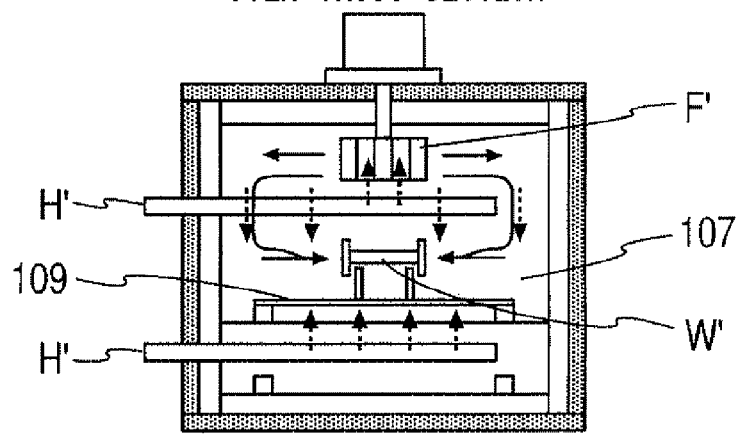
FIG. 12B is a lateral cross-sectional view of the brazing system according to the related art.
Figure 12C:
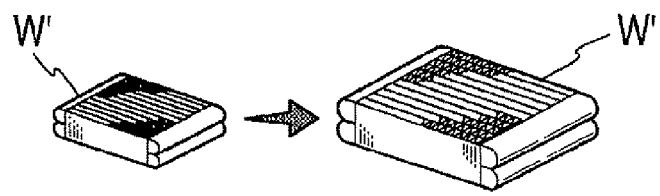
FIG. 12C is a perspective view for explaining the size of a heat exchanger to be processed by the brazing system according to the related art.

FIG. 11 shows the overall configuration of a brazing system 1 according to a fourth embodiment of the present invention. The brazing system 1 of the present embodiment has the same basic configuration as the second embodiment and differs only in the point of the brazing chamber 2 and workpiece W being arranged vertically. That is, in the second embodiment, a flat-shaped workpiece W was arranged with the large heat receiving area core surfaces W4 as the top surface and bottom surface at top and bottom positions, but in the present embodiment, the facing two side surfaces at the left and right positions in the figure are the core surfaces W4. Therefore, the brazing chamber 2 makes the chamber surfaces 23 facing the left and right core surfaces W4 (two facing side surfaces at the left and right positions) out of a material passing near infrared rays, in this case quartz glass, and arranges pluralities of near infrared ray heaters 3 at the left and right of the same. Further, the brazing chamber 2 connects a gas introduction port 41 and gas discharge port 42 to the two other facing surfaces, that is, the bottom surface and top surface in the figure.

In this way, it is possible to heat the large heat receiving area core surfaces 4 of a workpiece W by radiant heat of the near infrared ray heaters 3 and make the direction of flow of gas for convection heating an up-down direction as a whole with respect to the direction of the radiant heating (left-right direction). In this case as well, due to the perpendicular intersection of the direction of radiant heating and direction of convection heating, a similar effect is obtained of transfer of heat from high temperature parts to low temperature parts of the workpiece W and elimination of temperature unevenness in the horizontal plane of a workpiece W.

The present invention is not limited to a heat exchanger and can be employed for brazing various metal car-mounted parts. It enables parts for brazing to be heated uniformly at a high speed inside a small sized brazing chamber.

While the invention has been described by reference to specific embodiments chosen for purposes of illustration, it should be apparent that numerous modifications could be made thereto by those skilled in the art without departing from the basic concept and scope of the invention.

The invention claimed is:

1. A brazing system for brazing component members of a workpiece, comprising:
   a brazing chamber an inside of which is made a heating space of a volume corresponding to said workpiece;
   a radiant heating means provided with a plurality of heating sources for heating said workpiece which is held in said heating space by radiant heat, the plurality of heating sources positioned so as to correspond to a plurality of regions of the workpiece into which two facing surfaces of the workpiece which faces the heating sources are respectively divided;
   a convection heating means for circulating a heated inert gas to said heating space so as to heat said workpiece by convection heating; and
   a control means for controlling the operation of said plurality of heating sources and the circulation of said inert gas,
   wherein each of the heating sources is independently controlled by said control means, and
   wherein said convection heating means circulates the inert gas by convection so as to reduce a temperature difference of said workpiece caused by said plurality of heating sources.

2. A brazing system as set forth in claim 1, wherein said workpiece is a flat shape and the surfaces with the large heat receiving areas are made said two facing surfaces facing which said plurality of heating sources are arranged.

3. A brazing system as set forth in claim 1, wherein said plurality of heating sources are made near infrared ray heaters and are arranged in proximity to two facing surfaces of said brazing chamber comprised of a material passing near infrared rays.

4. A brazing system as set forth in claim 3, wherein an introduction port and discharge port of said inert gas are provided at the other two facing surfaces of said brazing chamber.

5. A brazing system as set forth in claim 1, wherein said plurality of heating sources are provided at least at four locations facing each of said two facing surfaces of said workpiece.

6. A brazing system as set forth in claim 1, wherein said workpiece is an aluminum heat exchanger.

7. A brazing system as set forth in claim 1, wherein said control means makes said inert gas a certain temperature near the brazing temperature of said workpiece and performs feedback control for said plurality of heating sources based on the temperatures of the plurality of regions of said workpiece which are detected by a plurality of temperature detecting means.

* * * * *